United States Patent [19]

Mueller et al.

[11] Patent Number: 4,827,198
[45] Date of Patent: May 2, 1989

[54] VEHICLE WINDSHIELD AND WIPER WITH RAIN SENSOR

[75] Inventors: Donald L. Mueller, Dayton, Ohio; Glen A. Nyberg, Warren, Mich.

[73] Assignee: General Motors Corporation, Detroit, Mich.

[21] Appl. No.: 159,533

[22] Filed: Feb. 9, 1988

[51] Int. Cl.⁴ .............................................. B60S 1/08
[52] U.S. Cl. ................... 318/483; 318/444; 318/DIG. 2; 15/250 C
[58] Field of Search ......... 318/443, 444, 483, DIG. 2; 15/250 C, 250.12

[56] References Cited

U.S. PATENT DOCUMENTS

| | | | |
|---|---|---|---|
| 2,206,820 | 7/1940 | Mydlil | 250/33 |
| 3,786,330 | 1/1974 | Inoue et al. | 318/483 |
| 3,826,979 | 7/1974 | Steinmann | 318/483 X |
| 4,238,799 | 12/1980 | Parfitt | 343/715 |
| 4,567,412 | 1/1986 | Graham | 318/444 X |
| 4,588,935 | 5/1986 | Kaneiwa et al. | 318/483 |
| 4,613,802 | 9/1986 | Kraus et al. | 318/443 X |
| 4,665,351 | 5/1987 | Nyberg | 318/483 |
| 4,703,237 | 10/1987 | Hochstein | 318/DIG. 2 X |
| 4,740,735 | 4/1988 | Hayashi | 318/444 X |
| 4,748,390 | 5/1988 | Okushima et al. | 318/483 |

FOREIGN PATENT DOCUMENTS

| | | | |
|---|---|---|---|
| 2345546 | 3/1975 | Fed. Rep. of Germany | 318/483 |
| 1382261 | 1/1975 | United Kingdom | 318/DIG. 2 |
| 2105184 | 3/1983 | United Kingdom | |

Primary Examiner—Bentsu Ro
Attorney, Agent, or Firm—Robert M. Sigler

[57] ABSTRACT

A pair of outer conducting members on the outside of a windshield are separated by a long common insulating border defining a border resistance in parallel with a first capacitance. Each of the outer conducting members is capacitively coupled through a layer of the windshield to an inner conducting member to form coupling capacitances in series with the combination of the border resistance and first capacitance. The preceding elements form a timing circuit for an oscillator, the timing circuit having an equivalent capacitance varying with the border resistance. When water droplets bridge the border of the outer conducting members, the border resistance decreases from infinity to change the equivalent capacitance of the timing circuit and thus the frequency of the oscillator circuit; and this change is detected to modify wiper operation.

4 Claims, 2 Drawing Sheets ing members on the outside of the windshield. The conducting members on the outside of the windshield, however, must be electrically connected in some way to the wiper control within the vehicle, which connection may be by means of connectors routed in an unsightly manner across the outer surface of the windshield from the sensor or may require an opening formed through the windshield.

SUMMARY OF THE INVENTION

This invention provides a capacitive coupling for each of the conducting members on the outside of the windshield through at least one glass layer of the windshield to inner conducting members within the vehicle. It further provides a long common border between the conducting members on the outside of the windshield which defines a border resistance and parallel capacitance therebetween, the combination being in series with the coupling capacitances. These elements form a timing circuit for an oscillator having a frequency of oscillation dependent on the equivalent capacitance of the timing circuit as it is charged and discharged. When water droplets bridge the border of the conducting members on the outside of the windshield they decrease the border resistance from infinity to a lower value and thus change the equivalent capacitance of the timing circuit.

An additional benefit of the apparatus is that the long border between the outer conducting members allows the use of creativity in designing a decorative or identifying logo on the outside of the windshield free of the clutter of connecting wires. The more involved the logo design, the greater the common border of the outer conducting members and thus the capacitance therebetween. Further details and advantages of the invention will be apparent from the accompanying drawings and following description of a preferred embodiment.

DESCRIPTION OF THE PREFERRED EMBODIMENT

Figure 4:
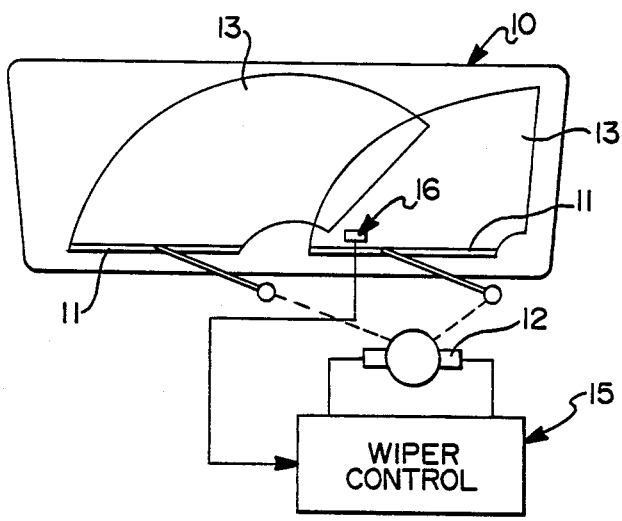
FIG. 4 is a schematic view of a vehicle windshield and wiper system according to the invention.

Referring to FIG. 4, a vehicle windshield 10 includes a pair of wiper blades 11 which are driven by a wiper motor 12 through standard drive linkage so as to repeat a wiper pattern over a designated area 13 of windshield 10. Motor 12 is controlled by a wiper control 15 in response to a sensor 16 located in the designated area 13 but generally out of the normal field of vision through windshield 10 past the front of the vehicle. A good location is high on the windshield in the vicinity of the rear view mirror.

Figure 1:
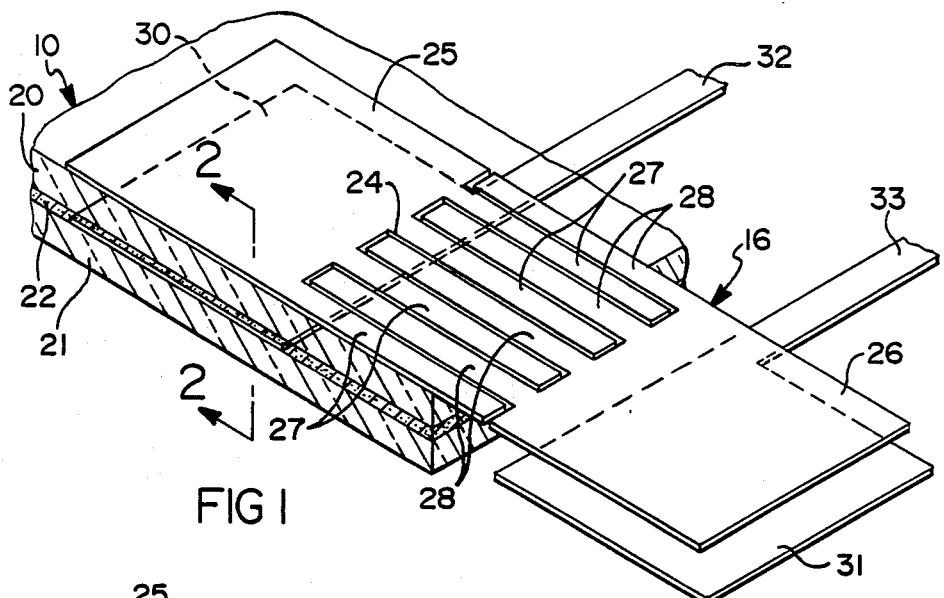
FIG. 1 shows a perspective view of a portion of a first embodiment of the invention.
Figure 2:
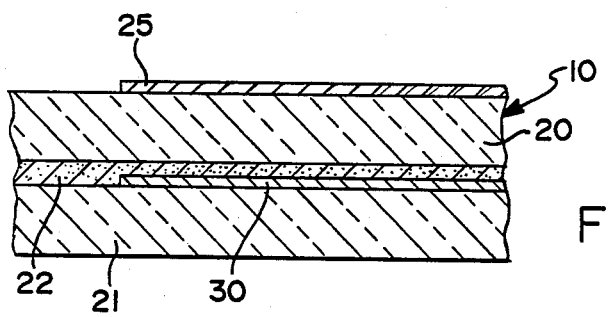
FIG. 2 shows a cutaway view along lines 2—2 of FIG. 1.

FIGS. 1 and 2 show a portion of windshield 10, which comprises a pair of glass layers 20 and 21 separated by a layer 22 of a thermoplastic resin such as PVB. A pair of outer conducting members 25 and 26 are attached to the outside of the windshield. Outer conducting members 25 and 26 are thin coatings of a conductive, semi-transparent material such as tin oxide on the outside of windshield 10 within designated area 13 so as to be cleared with each wipe of wiper blades 11. Outer conducting members 25 and 26 have a long common border 24 over which they are spaced slightly apart so as to form a border resistance therebetween which is, when dry, essentially infinite. In the embodiment of FIG. 1, this common border is lengthened by the formation of interdigitated fingers 27 and 28 of members 25 and 26, respectively. The separation along the common border is sufficiently small that it may be bridged by water droplets on the outer surface of windshield 10 to change the border resistance from an essentially infinite resistance to a smaller resistance in the range of several hundred kilohms.

It should be noted, however, that the slight separation of outer conducting members 25 and 26 also has a capacitive effect—producing a capacitance on the order of, for example, 50 pF. This capacitance is essentially in parallel with the border resistance. Referring to FIGS. 1 and 2, inner conducting members 30 and 31 are placed adjacent outer conducting members 25 and 26, respectively, separated therefrom by glass layer 20 in FIG. 1. Inner conducting members 30 and 31 may also be made of tin oxide and are separated from each other substantially so as to not form any significant capacitance with each other. The location of inner conducting member 30 within the layers of windshield 10 is shown most clearly in FIG. 2. Inner conducting members 30 and 31 have conductors 32 and 33, respectively, projecting therefrom for connection to wiper control 15. Connectors 32 and 33, being semi-transparent and buried under at least one layer of glass, are not particularly noticeable, as they might be if run across the outer surface of the glass; and they are further protected from wear and breakage.

Figure 5:
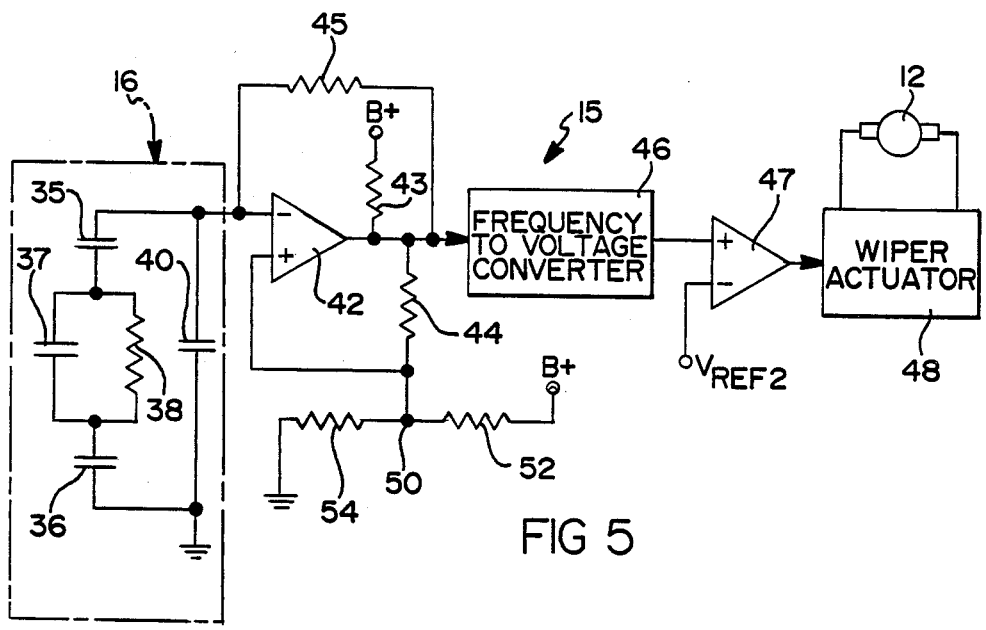
FIG. 5 is a circuit diagram illustrating the electrical operation of the invention.

Each of inner conducting members 30 and 31 forms with its adjacent outer conducting member 25 and 26, respectively, a capacitance of about 120 pF. The equivalent electrical circuit between inner conducting members 30 and 31 is shown on the left side of FIG. 5: a pair of 120 pF capacitances 35 and 36, corresponding to the capacitive couplings through glass layer 20, in electrical series with the parallel combination of a 50 pF capacitance 37 and border resistance 38 formed by the common border of outer conducting members 25 and 26. A 5 pF capacitance 40 represents the stray capacitance connected in parallel with the combination. Standard techniques are used to minimize this stray capacitance so that it is essentially of negligible effect in the circuit. Therefore the equivalent capacitance of the sensor combination when dry, with an infinite border resistance 38, is that of the three capacitances 35–37 in series, or about 27 pF.

This combination of elements 35–38 representing sensor 16 forms a timing circuit for an oscillator as follows. As shown further in FIG. 5, one end of this sensor combination is grounded and the other connected to the inverting input of a comparator 42 having an output with a pullup resistor 43 to B+ and another resistor 44 to the junction 50 of resistors 52 and 54 connected between B+ and ground. Junction 50 is also connected to the non-inverting input of comparator 42; and the output of comparator 42 is fed back to the inverting input through a resistor 45 to form an oscillator circuit. The oscillator operates by switching the output of comparator 42 between open collector and ground and simultaneously switching the reference voltage applied to the non-inverting input to provide hysteresis. When the output is open collector, the voltage applied to the non-inverting input of comparator 42 is at its higher value; and a charging path is established from B+ through resistors 43 and 45 for the combination of capacitors 35, 36, 37, 40 to raise the voltage at the inverting input of comparator 42. When the voltage on the inverting input increases sufficiently, the comparator switches its output to ground to switch the voltage on the non-inverting input of comparator 42 to its lower value and provide discharge of the capacitors through resistor 45 to ground. The capacitors discharge until the voltage at the inverting input of comparator 42 once again falls to the point where the output is switched open collector, at which the voltage on the non-inverting input is switched high again and the process repeats. Thus, the equivalent capacitance of the timing circuit 16, as determined by charging and discharging current therethrough, controls the charging and discharging times and therefore the frequency of oscillation of the oscillator.

Since capacitance 37, which is in parallel with resistance 38, is the smallest valued of the three series capacitances 35–37, it has the greatest effect of the three capacitances on the total equivalent capacitance and therefore the frequency of oscillation. As border resistance 38 decreases from infinity due to water droplets bridging the common border 24 of outer conducting members 25 and 26, the equivalent capacitance increases toward the value of 60 pF produced by a resistance 38 of zero. The water bridging the common border will probably not reach this low a resistance, but it may reach a resistance as low as 1 K for salty water, with a more typical resistance of 200 K. This will produce a different frequency out of the oscillator circuit than is obtained when the windshield is dry. The frequency of the oscillator circuit is detected, such as by a frequency to voltage converter 46, and compared in a comparator 47 to a reference such as voltage VREF2, which reference distinguishes between the frequency produced by a dry windshield and that produced by a wet windshield. The output of comparator 47 is used to modify the operation of a wiper actuator 48, for example by initiating wiper operation when a wet windshield is detected and terminating the operation a predetermined delay period after a dry windshield is detected. In this case, the value of resistor 45 is kept large compared to an expected value for the border resistance 38 to produce switch like operation. For example, a resistor 45 of about 1M may produce a switchlike action with a border resistance of about 200 K; whereas a resistor of about 2M may produce a switchlike action at a border resistance of about 500 K. The output of comparator 47 could also be utilized to modify the delay time of an intermittent wiper actuator by controlling the conduction of a transistor bypassing a portion of a capacitor charging circuit in the delay timer so as to increase delay time on a drier windshield and decrease delay time as the windshield becomes wetter. Action may be made more linear for this purpose by decreasing the value of resistor 45 to be about equal to the expected border resistance.

Figure 3:
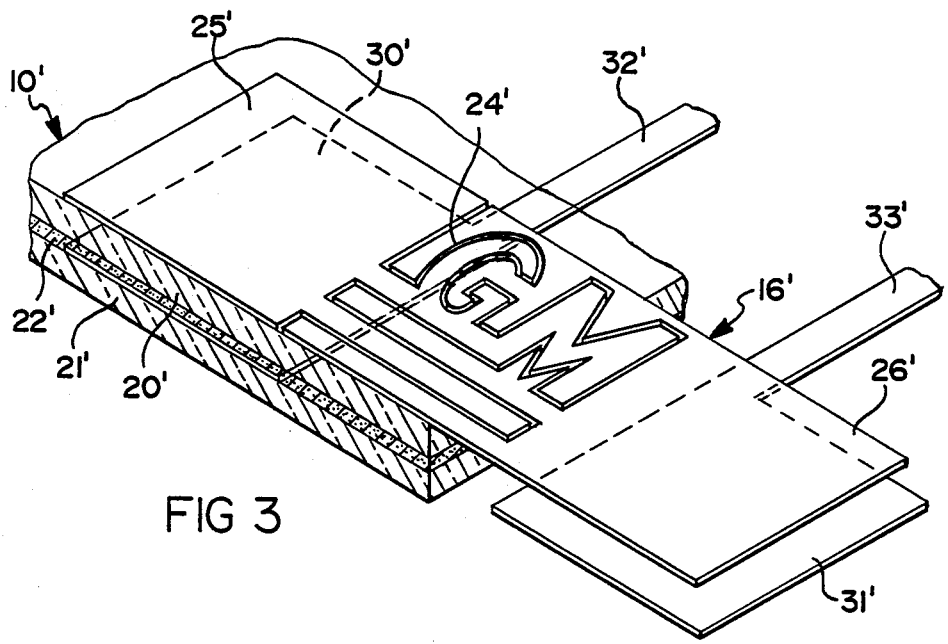
FIG. 3 shows a perspective view of a portion of a second embodiment of the invention.

A modified embodiment of the invention is shown in FIG. 3, wherein the need for a long common border between outer conducting members 25' and 26' is utilized to produce an identifying and decorative logo. Such a logo may particularly be a trademark identifying the vehicle on which the system of the invention is used, such as the GM (R) logo shown. Many other such logo designs will occur to those skilled in the art. The other elements of FIG. 3, identified with primed reference numbers, correspond to the equivalently unprimed reference numbers of FIG. 1.

The embodiments of the invention in which an exclusive property or privilege is claimed are defined as follows:

1. A motor vehicle windshield and wiper system comprising:
   a windshield having at least one glass layer;
   a wiper system having a blade on the outside of the windshield and drive means activatable to drive the blade in a predetermined pattern across a designated area of the windshield;
   first and second outer conducting members on the outside of the windshield within the designated area, said first and second outer conducting members being slightly separated along a long common border to define a border resistance in parallel with a first capacitance therebetween, the border resistance being essentially infinite when dry but decreasing with water bridging the border;
   first and second inner conducting members adjacent the first and second outer conducting members, respectively, and separated therefrom by at least the glass layer of the windshield, the first inner and outer conducting members being effective to define a second capacitance therebetween and the second inner and outer conducting members being effective to define a third capacitance therebetween in electrical series with the first and second capacitances;
   electrical oscillator circuit means including a timing circuit comprising the second, first and third capacitances in series, with the infinite resistance across the first capacitance, to form an equivalent capacitance, as determined by charging and discharging current therethrough, the equivalent capacitance varying with change in the border resistance, the electrical oscillator circuit means having a frequency of oscillation dependent on the equivalent capacitance of the timing circuit; and additional circuit means responsive to the frequency of the electrical oscillator circuit means to produce a first mode of wiper operation when the common border is dry and a second mode of wiper operation when the common border is bridged by water.

2. The motor vehicle windshield and wiper system of claim 1 in which the first and second outer conducting members are formed of an at least partially transparent coating on the outer surface of the windshield.

3. The motor vehicle windshield and wiper system of claim 1 in which the first and second outer conducting members form a unique identifying logo defined by the long common border therebetween.

4. A motor vehicle windshield and wiper system comprising:

a windshield having at least one glass layer;

a wiper system having a blade on the outside of the windshield and drive means activatable to drive the blade in a predetermined pattern across a designated area of the windshield;

first and second outer conducting members on the outside of the windshield within the designated area, said first and second outer conducting members being made of semi-transparent tin oxide and being slightly separated along a long common border to define a border resistance in parallel with a first capacitance therebetween, the border resistance being essentially infinite when dry but decreasing with water bridging the border;

first and second inner conducting members adjacent the first and second outer conducting members, respectively, made of the same material and separated therefrom by at least the glass layer of the windshield, the first inner and outer conducting members being effective to define a second capacitance therebetween and the second inner and outer conducting members being effective to define a third capacitance therebetween in electrical series with the first and second capacitances;

electrical oscillator circuit means comprising a comparator having a fixed reference connected to one input, a timing circuit connected to the other input, the timing circuit comprising the second, first and third capacitances in series, with the infinite resistance across the first capacitance, to form an equivalent capacitance, as de by charging and discharging current therethrough, the electrical oscillator circuit means further comprising comparator switched current means effective to charge and discharge the equivalent capacitance at a frequency determined thereby and thus varying with change in the border resistance; and additional circuit means responsive to the frequency of the electrical oscillator circuit means to produce a first mode of wiper operation when the common border is dry and a second mode of wiper operation when the common border is bridged by water.

* * * * *